Dec. 2, 1941.     K. E. BEMIS     2,264,611
TIME AND TEMPERATURE CONTROL MEANS FOR COOKING MACHINES
Filed July 5, 1940
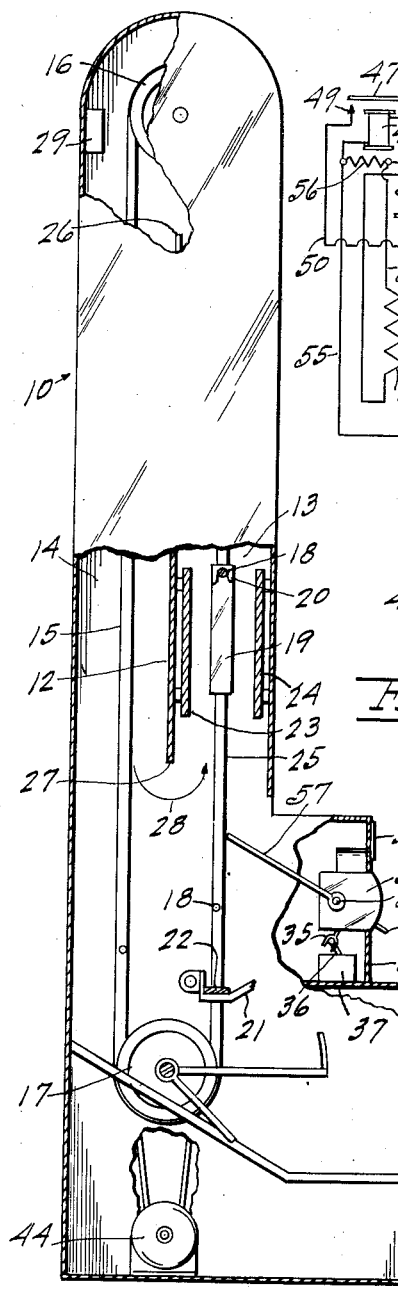
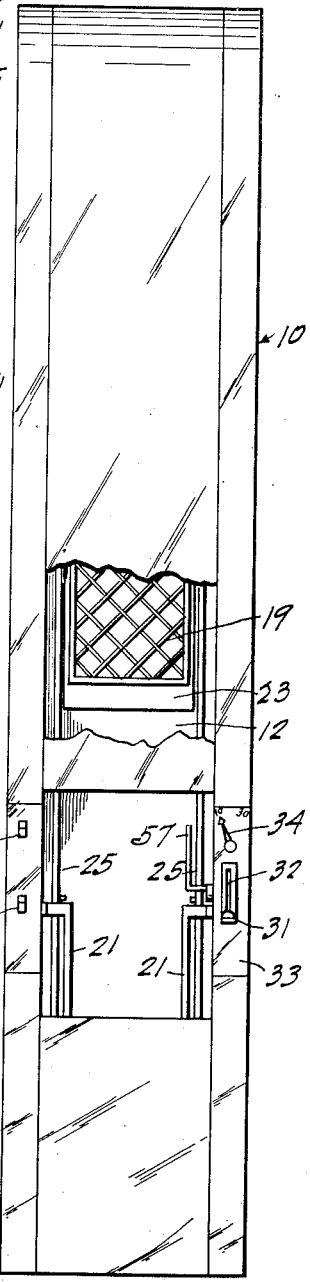
Inventor
Kenneth E Bemis
By Philip A Tridell
Attorney Patented Dec. 2, 1941

2,264,611

UNITED STATES PATENT OFFICE 2,264,611

TIME AND TEMPERATURE CONTROL MEANS FOR COOKING MACHINES

Kenneth E. Bemis, Oakland, Calif.

Application July 5, 1940, Serial No. 344,183

7 Claims. (Cl. 219—19)

This invention, time and temperature control means for cooking and baking machines, is specifically adapted for the control of processing times and temperatures, and particularly designed for use in connection with my Patent No. 2,138,913, issued December 6, 1938, and No. 2,168,391, issued August 8, 1939.

In various cooking and baking operations, the duration of treatment to specific temperatures and the temperatures of treatment constitute vital factors in the production of products of high quality and of distinctive flavor.

In the devices covered by the above patents it is intended that the flow of materials for treatment should be continuous, under which conditions, with suitable adjustment of a thermostat, the continuous introduction of cold materials for processing and the cold carriers or receptacles will absorb sufficient heat to maintain a correct processing temperature.

In the present invention it is proposed to adapt the same types of ovens for intermittent feeding of materials to be processed in conformity with small demands, and under the conditions of operation prescribed by the devices of the above mentioned patents, the temperature within the oven will obviously increase to prohibitive limits with this intermittent feeding unless the heating units are suitably controlled, or cut out of circuit following each cycle of processing. This last method would require reheating of the oven when another batch of material was ready for processing and which would be definitely undesirable, since the oven should be maintained constantly in condition for immediate use. It is this last feature which constitutes the essence of this invention.

The objects of the invention are as follows:

First; to provide an oven with means for maintaining a constant temperature in a predetermined zone and to provide an increased temperature in a communicating zone at will, for a predetermined period of time.

Second; to provide an oven with means as outlined in which the increased temperature can be adjusted as to elapsed time to provide for the necessary high temperature processing and to restore the heat absorbed by the cold materials and elements entering the oven.

Third; to provide a time control apparatus which can be adjusted for any desired period of high heat operation and for any additional desired period, and at the termination of said period cause the control of heat to be assumed by a thermostat for maintaining a constant heat between high heats.

In describing the invention reference will be made to the accompanying drawing in which:

Fig. 1 is a side elevation of a cooking machine shown in section to disclose the inner construction, and with the invention applied thereto.

Fig. 2 is a front elevation of Fig. 1 with a portion of the front paneling removed.

Fig. 3 is a wiring diagram of the invention illustrated in its simplest form.

This invention is illustrated in connection with an oven 10 of the type disclosed in the previously mentioned patents in which the oven has an opening only at the lower end with the bottom of the oven indicated at 11, although the invention is applicable to other types of heat processing apparatus.

A central baffle 12 divides the oven into two compartments 13 and 14, respectively high heat and low heat, and up-draft and down-draft, and forms a circulatory path for the air which is thermally confined within the oven.

A conveyor 15 operates over a head pulley 16 and over a tail pulley 17 and is provided with carrier attachments 18 similar to the arrangement disclosed in my copending application Serial No. 344,184 filed July 5, 1940, for Feeding and discharging arrangement for conveyors, for supporting the carriers 19 while they are being transported about the circulatory path 13—14, and these carriers have suitable arms 20 for cooperation with these attachments, the carriers being picked up from the inclined delivery rails 21. The arm 22 of a second carrier is indicated in position on the rails and ready to be picked up by the next pair of attachments.

Heating elements 23 and 24 are respectively mounted on opposite sides of the up-traveling conveyor strands 25 and on one side only of the baffle, creating a high heat or braising compartment 13 and low heat compartment 14, and cause thermal circulation of the air within the oven about the top 26 and bottom 27 of the baffle 12 as indicated by the arrow 28.

The invention consists of a thermostatic switch 29 located in the upper part of the oven for controlling the temperature therein; an adjustable timing device 30 which may be selected from any of the suitable timers which are commercially available, such as clock timers, or of one of the types discolsed in my Patent No. 2,177,166, issued October 24, 1939, or 2,196,968, issued April 16, 1940, which is similar to the type illustrated herein, or that disclosed in my copending application Serial No. 286,082, filed July 24, 1939, when suitably modified for this specific type of installation; a switch actuated by the timer; and suitable circuits and control means therefor.

The timing device 30 illustrated is one of the conventional clock timers and has a rewind lever 31 for winding the clock spring (the interior mechanism not being illustrated since the structure is well known in the art) and which operates through a slot 32 formed through the front wall 33 of the oven base; a time setting lever and indicator 34 which is manually adjustable for various periods of operation and which controls the degree of winding and therefore the elapse-time period of operation of the clock works; and an actuating lever 35 which cooperates with the toggle lever 36 of the switch 37 and which throws the toggle lever 36 to circuit closing position when the rewind or setting lever 31 is depressed, and to circuit breaking position when the timer has completed its cycle in conformity with the setting of the indicator 34.

For purposes of illustration the operation of the invention will be explained in connection with the processing of meats, such as steaks, chops, spare ribs.

Different varieties of meats and different cooking processes require different periods of braising while the temperature for braising and the cooking temperatures following braising may be maintained substantially the same for the different varieties.

The oven is preheated by closing the switch 38 which completes a circuit from one side 39 of the source of potential, through conductor 40, heating unit 24, thermostatic switch 29, which is closed when cold, conductor 41 to the other lead 42 of the source of potential.

The switch 43 is used for controlling the driving means for the conveyor, such as the motor 44.

The heating unit 24 is thus energized and heats the interior of the oven, and when a predetermined temperature is attained as governed by the thermostat, the thermostatic switch 29 opens and breaks the circuit, and again remakes the circuit when the temperature drops below the predetermined, therefore a substantially uniform temperature is maintained when the machine is idle and the machine is therefore at all times ready for immediate use.

When a cut of meat is to be processed, it is placed in a carrier 19, the conveyor is set into operation, the carrier is placed on the rails 21 on which it slides down to the position indicated at 22. The next pair of approaching carrier attachments pick the carrier up and start it through the circulatory path within the oven.

The indicating lever 34 is set to the desired duration of braising treatment and the setting lever 31 is depressed, which operation closes the switch lever 36 to contact 45, completing circuit irrespective of the open or closed condition of the thermostatic switch 29, from the one side 39 of the source of potential, through switch 38, conductor 40, heating unit 24, conductor 46, armature 47 of relay 48, contact 49, conductor 50, to the other leg 42 of the source of potential, or, from the heating unit 24 through the thermostatic switch 29 as a shunt in the event that the thermostatic switch is closed.

Simultaneously, a circuit is completed from conductor 40 through conductor 51, switch 36 to contact 45, thence through conductor 52 to heating unit 23, conductor 54 to the relay 48, thence through conductor 55 to the other leg 42 of the source of potential; a suitable shunt 56 being introduced across the relay for suitable operation of the heating unit. Thus both heating units are simultaneously placed in operation and control by the thermostat is terminated.

With both units heated, a high braising temperature is provided and the carrier is carried up between these heated units, braising the meat on both sides. When the time period expires for which the timer is adjusted, the timer throws its lever 35 to the position opposite to that shown and breaks the circuit through switch 37, cutting the heating unit 23 out of circuit and placing the thermostat again in control of the one heating unit 24, and for the remainder of the cooking period the temperature in the oven is maintained at a constant value by the thermostat.

One of the heating units 23 or 24 maintains a uniform heat in the oven. When the timer lever 31 is depressed the thermostatic switch is shunted and both heating units are cut into circuit devoid of influence by the thermostat for the period of time for which the timer is set.

The meat carried by the carrier is subjected to a high temperature while it passes between the units—the timer being set to maintain operation of both units sufficiently long to restore the heat absorbed by the carrier and the material carried therein—after which it breaks the circuit to the unit which it controls as also that of the shunt across the thermostatic switch, following which the oven temperature is again under complete control of the thermostat.

For automatic operation, a setting lever 57 is attached to the shaft 58 on which the lever 31 is also mounted.

The lever 57 clears the pins 18 and therefore can be actuated only by a traveling carrier which in its uptravel winds the timer by raising the lever 57, thus effecting the same result as does depression of the lever 31, with the exception of accuracy as to the period of initiation of the timing cycle.

The method in which initiation of the time-elapse period is controlled by the carrier assures positive timing and eliminates the delay period between the time of deposit of the carrier on the support 21 and its pickup by the carrier attachments since heating of both units will not be initiated until the carrier reaches a predetermined point in its travel.

The timer will be started in operation each time a carrier is transported by the conveyor and will be automatically reset at the completion of the elapse-time period for which the timer is adjusted, and uniform time of exposure to the pair of heating units is thus assured for each carrier transported by the conveyor. It also assures the starting of the operation of the timer at the correct instant.

Obviously, although not illustrated in the principal views, a circuit and two switches may replace the switch 36 and the clock timer 30. One method of making the timing entirely electrically controlled is illustrated in the wiring diagram Fig. 4, in which the switches 36' and 36" replace both, the switch 36 and timer 30.

When a carrier raises the lever 36" to close the circuit, the lever 36' is simultaneously closed, completing the circuit through wire 51, lever 36', wire 59, lever 36" to wire 52, and when the lever 36' is raised by the carrier it simultaneously opens switch 36", breaking the circuit and coincidently resetting lever 36" for control of the circuit by the next following carrier. Lever 36' can readily be made adjustable vertically by well known means.

I claim:

1. Processing control means for an oven having a feed and a discharge opening at the lower end and being otherwise enclosed, and a pair of heating units located therein, and a conveyor for transporting food carriers about a circulatory path within the oven, comprising; a circuit for each of the units; a thermostatic switch mounted in the upper end of the oven and normally controlling one of said circuits; a timing arrangement and a switch controlled thereby for controlling both circuits and completing a circuit to the other unit and shunting said thermostatic switch and thereby placing both units in operation during each operation of said timing arrangement, and actuating means associated with said timing arrangement and cooperatively related to said carriers and cooperating therewith when the carriers are transported through a predetermined portion of the path for sequentially storing energy in said timing arrangement, and releasing said actuating means for operation of said timing arrangement as each carrier is transported through said predetermined portion of the path.

2. Processing control means as defined in claim 1 in which said timing arrangement includes means cooperatively related to said actuating means and manually operable for adjusting the duration of operation and consequently the duration of operation of the two units simultaneously.

3. Processing control means for an oven having an enclosed upper portion and having an opening in the lower portion for introduction of foods to be processed, and a thermostatic switch controlled by heat within the oven and located within the upper portion; and heating units oppositely located in said oven and a conveyor for transporting carriers between said heating units and about a circulatory path within the oven, comprising; a circuit for each heating unit with one of said circuits including said thermostatic switch; and timing means manually adjustable as to elapse-time periods of operation and including actuating means and switch means controlled by said timing means for connecting said circuits in parallel and simultaneously shunting said thermostatic switch and maintaining said circuit conditions throughout the time-elapse period of operation of said timing means; said actuating means cooperating with carriers transported by the conveyor for sequentially storing energy in said timing means and releasing the same for timing the period of operation of said heating means; said timing means coincident with the termination of said time-elapse period returning said circuits respectively to control by said thermostatic switch by a following carrier and to open circuit.

4. A temperature control for an oven having heating units therein and transporting means for transporting food carriers about a circulatory path within the oven, comprising; a thermostatic switch in said oven; a timing device including a timing switch; a circuit for each heating unit; one of said circuits including said timing switch and means for completing the other circuit when said timing switch is closed; the other of said circuits including said thermostatic switch for controlling said other circuit when said timing switch is open for maintaining a uniform temperature in the oven; and actuating means associated with said timing device and cooperatively related to carriers transported by said transporting means and actuated thereby through a predetermined distance of travel about the circulatory path for sequentially storing energy in said timing device, completing said one of said circuits, and releasing the timing device for a cycle of operation; said timing device breaking said one of said circuits at the completion of a cycle of operation while leaving the other of said circuits under control of said thermostat; said timing device including means returning said actuating means to its initial position for cooperation with a following carrier at the completion of a cycle of operation.

5. A structure as defined in claim 4; said actuating means comprising an arm associated with and extending from said timing device into the circulatory path; and means manually adjustable and operatively associated with said timing device for adjusting the time-elapse period of operation of said timing device following release of said arm by said carrier.

6. Temperature control means for an oven having heating units therein and transporting means for transporting food carriers about a circulatory path within said oven, comprising; a timing device having an actuating arm projecting into the circulatory path for cooperation with the carriers sequentially, and including a first switch; a thermostat within said oven and including a second switch; a third switch; a plurality of circuits; one of said circuits including said first switch, one heating unit, and means for closing said third switch when said first switch is closed to complete a second circuit through the other heating unit; and a third circuit including the other heating unit and said thermostatic switch for shunting said second circuit when said first switch is open and the temperature drops below a predetermined value; said carriers, upon cooperation with said actuating arm sequentially storing energy in said timing device, completing said first circuit and coincidently said second circuit in the event said second switch is open, followed by release of said actuating arm for operation of said timing device through a cycle of operation; said actuating arm returning to its initial position upon completion of a cycle of operation for cooperation with a following carrier.

7. Processing control means for an oven having transporting means for transporting food carriers about a circulatory path within the oven, comprising; first heating means and thermostatic control means therefor for maintaining a normal uniform temperature within the oven; second heating means and timing means therefor for timing a cycle of operation thereof and including means interrupting the control of said first heating means by said thermostatic control for simultaneous operation of both of said heating means during a cycle of operation of said timing means, and returning said first heating means to control of said thermostatic control at the completion of a cycle of operation of said timing means; and actuating means associated with said timing means and cooperatively related to the carriers for cooperation therewith at a predetermined location in the path of travel for actuation of said timing means for a cycle of operation and including setting means for returning said actuating means to its initial position at the completion of a cycle of operation for cooperation with a following carrier.

KENNETH E. BEMIS.